United States Patent
Trevathan et al.

(10) Patent No.: US 11,245,725 B2
(45) Date of Patent: Feb. 8, 2022

(54) DYNAMICALLY UPDATING POLICY CONTROLS FOR MOBILE DEVICES AND APPLICATIONS

(71) Applicant: Kony Inc., Orlando, FL (US)

(72) Inventors: Matthew B. Trevathan, Roswell, GA (US); Keith Katz, Orlando, FL (US)

(73) Assignee: Matthew B. Trevathan, Roswell, GA (US)

( * ) Notice: Subject to any disclaimer, the term of this patent is extended or adjusted under 35 U.S.C. 154(b) by 240 days.

(21) Appl. No.: 15/135,723

(22) Filed: Apr. 22, 2016

(65) Prior Publication Data

US 2016/0315967 A1    Oct. 27, 2016

Related U.S. Application Data

(60) Provisional application No. 62/152,274, filed on Apr. 24, 2015.

(51) Int. Cl.
| | |
|---|---|
| *G06F 17/00* | (2019.01) |
| *H04L 29/06* | (2006.01) |
| *H04W 8/22* | (2009.01) |
| *H04W 4/80* | (2018.01) |
| *H04W 12/08* | (2021.01) |
| *H04W 12/37* | (2021.01) |
| *H04W 8/18* | (2009.01) |

(52) U.S. Cl.
CPC .............. *H04L 63/20* (2013.01); *H04W 4/80* (2018.02); *H04W 8/22* (2013.01); *H04W 12/08* (2013.01); *H04W 12/37* (2021.01); *H04W 8/18* (2013.01)

(58) Field of Classification Search
CPC ........ H04L 63/20; H04W 4/80; H04W 12/08; H04W 8/22; H04W 8/18
See application file for complete search history.

(56) References Cited

U.S. PATENT DOCUMENTS

| | | | |
|---|---|---|---|
| 9,973,534 B2* | 5/2018 | Mahaffey | H04L 63/20 |
| 2006/0153122 A1* | 7/2006 | Hinman | H04L 67/04 370/328 |
| 2011/0167499 A1* | 7/2011 | Strom | G06F 21/121 726/27 |
| 2012/0023554 A1* | 1/2012 | Murgia | H04L 63/102 726/4 |
| 2012/0084857 A1* | 4/2012 | Hubner | G08B 25/001 726/22 |
| 2014/0108649 A1* | 4/2014 | Barton | G06F 9/45533 709/224 |
| 2014/0331166 A1* | 11/2014 | Li | G06F 3/0481 715/772 |

* cited by examiner

*Primary Examiner* — Fatoumata Traore
*Assistant Examiner* — Carlton Johnson
(74) *Attorney, Agent, or Firm* — Andrew M. Calderon; Roberts Calderon Safran & Cole, P.C.

(57) ABSTRACT

A method, comprises: receiving, by a server device, a policy identifier from a user device, wherein the policy identifier represents the occurrence of an event on the user device; matching, by the server device, a policy to the policy identifier; and outputting, by the server device, the matched policy to the user device to cause the user device to set the policy on the user device.

20 Claims, 7 Drawing Sheets

210

| Event to Policy ID Mapping 710 ||
|---|---|
| Event | Policy ID |
| Application 1 | Policy ID 1 |
| Sub-application 1 | Policy ID 2 |
| Content 1 | Policy ID 3 |
| Copy/paste | Policy ID 4 |
| WiFi On | Policy ID 5 |
| WiFi Off | Policy ID 6 |
| Bluetooth On | Policy ID 7 |
| Bluetooth Off | Policy ID 8 |
| Screen Shot | Policy ID 9 |

215

| Policy Mapping 720 |||
|---|---|---|
| Device Information | Policy ID | Policy |
| Device Information Set 1 | Policy ID 1 | Policy 1 |
| Device Information Set 2 | Policy ID 1 | Policy 1 |
| Device Information Set 3 | Policy ID 1 | Policy 2 |
| Device Information Set 4 | Policy ID 1 | Policy 3 |
| Device Information Set 5 | Policy ID 1 | Policy 4 |
| Device Information Set 1 | Policy ID 2 | Policy 2 |
| Device Information Set 2 | Policy ID 2 | Policy 2 |
| Device Information Set 3 | Policy ID 2 | Policy 3 |
| Device Information Set 4 | Policy ID 2 | Policy 1 |
| Device Information Set 5 | Policy ID 2 | Policy 6 |

FIG. 7

DYNAMICALLY UPDATING POLICY CONTROLS FOR MOBILE DEVICES AND APPLICATIONS

FIELD OF THE INVENTION

The invention relates to control of mobile and device applications and, more particularly, to systems and processes for dynamically implementing policy updates for controlling mobile devices and applications.

BACKGROUND OF THE INVENTION

Mobile Device Management (MDM) is a system in which functions of a registered user device (e.g., a smart phone, a tablet, etc.) can be remotely controlled (e.g., by an administrator server). For example, the administrator server may control or block functions of the user device, such as screen capture functions, microphone usage, camera usage, usage of certain communications hardware (e.g., Bluetooth, NFC, WiFi, etc.), access to device services (e.g., messaging), etc.

MDM techniques are sometimes used in Enterprise Mobility Management (EMM) suites in which the user device is owned by an organization or company and has been issued to an employee. An administrator may use an MDM system to control the allowed functions of the user device (e.g., so that usage of the user device complies with certain security and/or company policies). For example, an enterprise or company may have a policy that screen shots of sensitive information presented within a particular application should not be taken. To adhere to this policy, an administrator may implement an MDM policy to prevent the user device from taking screen shots. As a cost-savings alternative to providing employees with company issued user devices, companies may allow their employees to use the employee's personal user devices for both personal and business functions. In order to ensure compliance with security policies, MDM techniques are implemented on a personal user device.

MDM is limited in that entire functions of the user device may be blocked, regardless of what the user device is being used for. For example, in the preceding example, the user will be unable to take screen shots entirely, even if the user is not accessing sensitive information.

Application-specific control policies can be implemented in which a small select subset of (e.g. camera use, copy/paste use) functions are disabled based on the application in the foreground of the user device. For example, application developers can add contextual capabilities to their application by directly programming these into the application effectively hard coding the policy into the application itself. For instance, if a developer would like to control access to specific forms in an application given the location of the individual using the application, the developer would build in hardcode logic into the application to determine the user's location and deny access based on the user location.

Issues arise implementing policy changes for the application. For example, since policies are hardcoded into the application, changing the policies for the application (e.g., to allow a specific subset of users to be granted new permissions when using the application) requires a lengthy redeployment and republishing of the application. Further, changing the policies would require the user to update the application in order to effectuate the changes, thus outdated policies may be implemented until the application is updated. Additionally, access to specific changes would require the user to fully restart the application in order for those changes to take effect therefore preventing a policy for being pushed to the application while in use. Most critically, the list of features that can be hard coded to be controlled is a small subset of the device level controls available through MDM policy.

SUMMARY OF THE INVENTION

In an aspect of the invention, a method, comprises: receiving, by a server device, a policy identifier from a user device, wherein the policy identifier represents the occurrence of an event on the user device; matching, by the server device, a policy to the policy identifier; and outputting, by the server device, the matched policy to the user device to cause the user device to set the policy on the user device.

In an aspect of the invention, there is a computer program product comprising a computer readable medium having program instructions embodied therewith. The computer readable medium is not a transitory signal per se, and the program instructions are readable by a server device to cause the server device to perform a method comprising: receiving a policy identifier from a user device, when the user device detects the occurrence of an event, wherein the policy identifier represents the occurrence of an event on the user device; matching a policy to the policy identifier; and outputting the matched policy to the user device to cause the user device to set the policy on the user device.

In an aspect of the invention, a system includes: a CPU, a computer readable memory and a computer readable medium; program instructions to receive a policy identifier from a user device based on an occurrence of an event in a registered application; program instructions to match a policy to the policy identifier; and program instructions to output the matched policy to the user device to cause the user device to apply the policy; wherein the program instructions are stored on the computer readable medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 7 shows example data structures that may be used to identify policy information based on policy ID and user device information in accordance with aspects of the present disclosure.

DETAILED DESCRIPTION OF THE INVENTION

Figure 1:
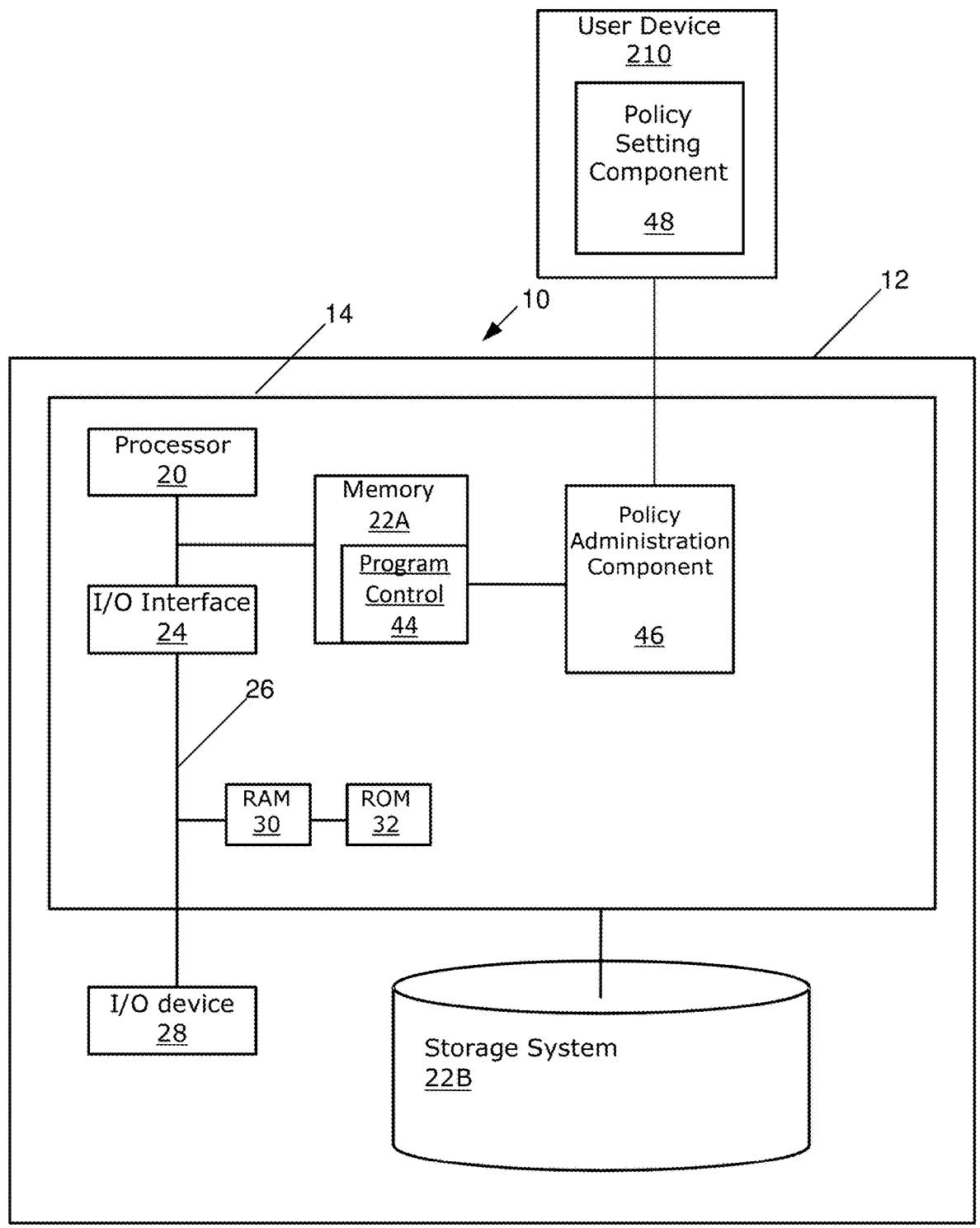
FIG. 1 shows an illustrative environment for managing the processes in accordance with the present disclosure.

The invention relates to control of mobile and device applications and, more particularly, to systems and processes for dynamically implementing policy updates for controlling mobile devices and applications. In more specific embodiments, the systems and processes described herein may dynamically update user device control and/or application policies based on the user's activity within a registered application. For example, policies may be updated dynamically based on the occurrence of an event that occurs in connection with a registered application (e.g., an application that is wrapped or stored in a secure container and is authorized to implement application and/or device control policies). In embodiments, the secure container may be hidden from the user such that the user is not aware that the registered application is stored in the secure container. As described herein, the secure container is used for obtaining policies from a policy server in order for the most current and updated policies to be set and implemented.

As an illustrative, non-limiting example, the most current policies may be applied based on the occurrence of event within a registered application (e.g., when the user instructs the user device to perform a task, such as access a sub-application or content within the registered application). As described herein, policies may be applied to disable one or more of: WiFi functions; Bluetooth functions; NFC functions; copy/paste functions; telephone calling functions; messaging functions; access to forms; access to applications; and/or any other functions on a user device as defined by an administrator.

For example, when a user attempts to access content within a registered application, policies associated with this action are obtained from a policy server and applied based on the event. Once the policies are applied, the registered application can be used in accordance with the policies. As an example, upon an occurrence of an event, e.g., an attempt to take a screen shot, a policy may be returned from the policy server and applied to prevent the user from capturing a screen shot such that sensitive information within the registered application is not able to be captured. Additionally, or alternatively, a policy may be applied to prevent the user from copy/paste functions, or e-mailing from the registered application (e.g., to prevent the sensitive information from being distributed). Accordingly, in embodiments, a policy may be obtained and applied based on the occurrence of event (e.g., when a user attempts to capture a screen shot, capture an image, copy/paste text, access a WiFi network, etc.) while using the registered application.

As described herein, the user device may receive a policy from the policy server (e.g., an EMM server, a Mobile Backend as a Service (MBaaS) server, or the like) each time an event occurs within a registered application. Accordingly, the user device may set and implement the most current or up-to-date policies without requiring redevelopment and/or redeployment of the application. In this way, a user device can be dynamically controlled based on the user's usage of the user device, and more specifically, the most up-to-date device and application control policies can be implemented. For example, updating a policy would only require an update to the policy information stored in the policy server, but would not require re-writing of the application code itself.

As described herein, the systems and processes may obtain policies based on the occurrence of an event within a registered application; however the occurrence of an event that occurs outside of the registered application may not trigger the need to obtain a policy. For example, if an event occurs outside of the registered application, the system and processes need not obtain and implement device and application control policies. In this way, only user activities that occur within a registered application is considered when obtaining and enforcing policies, thereby giving the user unrestricted access to device and application features when performing tasks in an unregistered application in which device and application control may not be needed. As an illustrative example, an unregistered application may include, for example, a gaming application in which device and application controls are not needed.

As described herein, the user device may set and implement the most up-to-date policies for a registered application without requiring redevelopment and/or redeployment of the registered application. Also, the user device may implement policies while a registered application is running in the foreground of the user device. Policies may be released when a registered application is closed, thereby allowing the user unrestricted access to device and application functions when the registered application is not in use.

In embodiments, the user device may store the policies for a predetermined period of time and until a predetermined activity occurs e.g., turning off the user device, once received from the policy server. The user device may store the policies for offline use in the event the policy server is not accessible at a later time. As described herein, access to certain events within a registered application may be blocked when the policy server is not accessible. The user device may update the policies with the received policies from the policy server when an event occurs within a registered application. Alternatively, the user device would not store the policies, and may only set and implement the policies based on the occurrence of an event within a registered application.

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in computer readable storage medium.

The computer readable storage medium is not a transitory signal per se, and is any tangible medium that can contain and store the program for use by or in connection with an instruction execution system, apparatus, or device. For example, the computer readable storage medium can comprise electronic, magnetic, optical, electromagnetic, infrared, and/or semiconductor systems and/or devices. More specific examples (a non-exhaustive list) of the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

Figure 2:
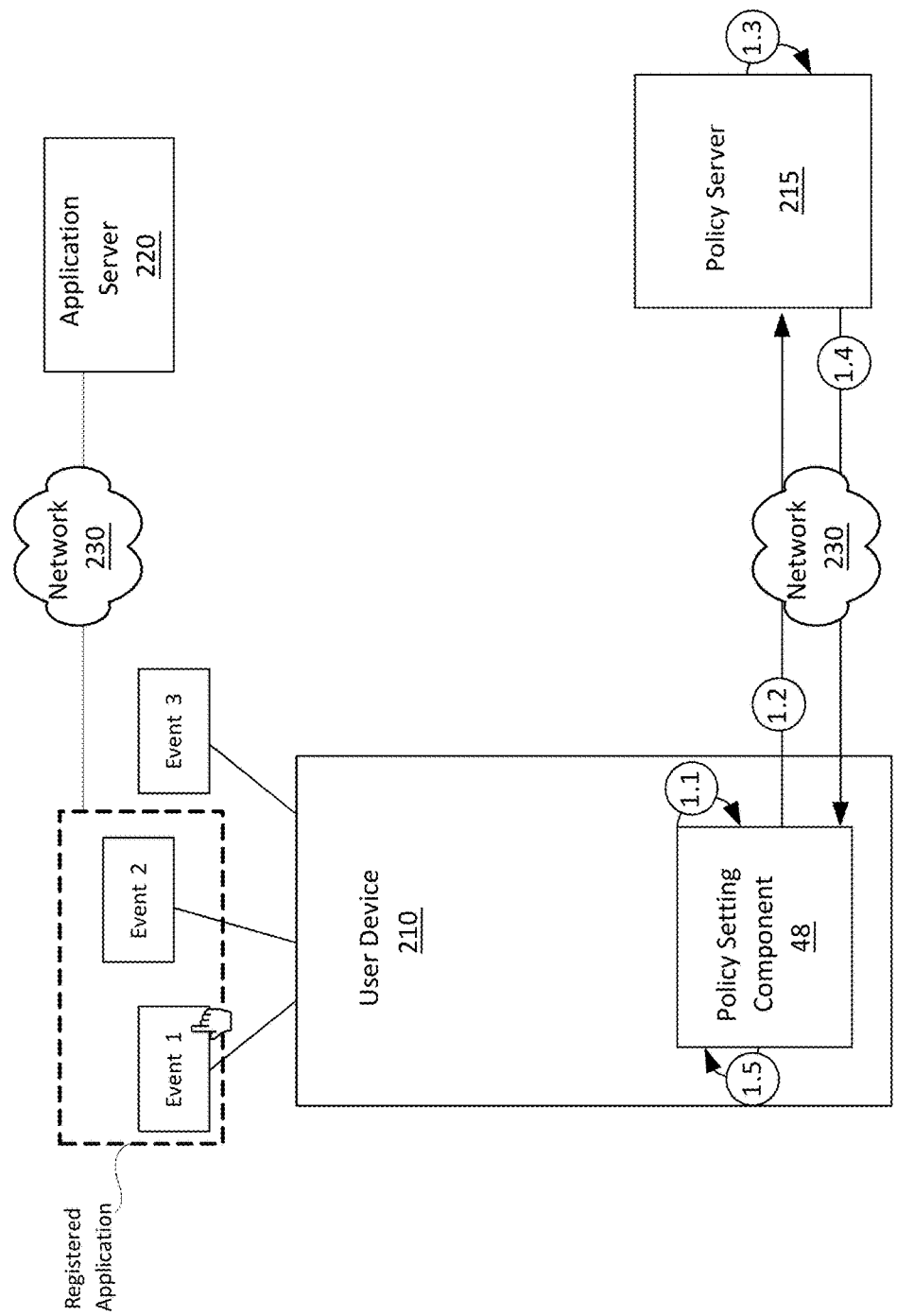
FIG. 2 shows an overview of an example environment in which aspects of the present disclosure may be implemented.

FIG. 1 shows an illustrative environment 10 for managing the processes in accordance with the invention. The environment 10 includes a server 12 or other computing system. The server 12 can be a standalone server, which implements the processes described herein within a networking environment. The server 12 and/or processes performed by the server 12 can be integrated into the networking environment (e.g., cloud environment) such as shown in FIG. 2 or any enterprise management system as described herein.

In specific embodiments, the server 12 can be representative of a mobile backend as a service (MBaaS), maintained by a service provider, e.g., Kony™. As should be understood by those of ordinary skill in the art, the MbaaS is a model for providing web and mobile application developers with a way to link their applications to backend cloud storage and APIs exposed by backend applications, while providing features such as user management, push notifications, and integration.

In embodiments, the server 12 can also be representative of other types of business enterprise servers, accessible via cloud based applications. For example, the server 12 can be a single, open standards-based mobile infrastructure platform. In embodiments, the single, open standards-based mobile infrastructure platform can unify multiple infrastructures/platforms together, including mobile application development platform (MADP), mobile backend as a service (MBaaS), Application Programming Interface (API) management, and platform as-a-service (PaaS) infrastructures. To this end, for example, the server 12 can be representative of Kony™ MobileFabric™ which is a converged mobile infrastructure that empowers enterprises to significantly reduce time to market. In this example, the server 12 can further integrate EMM/MAM server functions (e.g., management instances), as well as incorporate any number of enterprise stores, e.g., app store. For example, the server 12 can recognize any EMM provider with an API catalog, with publishing capabilities from a MBaaS.

In embodiments, the computing system 12 is accessible by users of user device(s) 210. As used herein, a user device 210 refers to a smartphone, tablet computer, personal digital assistant, or similar computing device that includes a mobile operating system, wireless communication antenna, processor, user interface, memory, etc.

In embodiments, the computing system 12 can be a standalone server, which implements the processes of the present invention within a networking environment. The computing system 12 and/or processes performed by the computing system 12 can be integrated into the networking environment of any enterprise. The computing system 12 includes a computing device 14 which can be resident on a network infrastructure or computing device. The computing device 14 includes a processor 20 (e.g., a CPU), a memory 22A, an I/O interface 24, and a bus 26. The bus 26 provides a communications link between each of the components in the computing device 14.

In addition, the computing device 14 includes a random access memory (RAM), a read-only memory (ROM), and an operating system (O/S). The computing device 14 is in communication with the external I/O device/resource 28 and a storage system 22B. The I/O device 28 can comprise any device that enables an individual to interact with the computing device 14 (e.g., user interface) or any device that enables the computing device 14 to communicate with one or more other computing devices (e.g., user device 210, etc.) using any type of communications link.

The processor 20 executes computer program code (e.g., program control 44), which can be stored in the memory 22A and/or storage system 22B. In embodiments, the program control 44 of the computing device 14 of the computing system 12 controls a policy administration component 46, which comprises program code that is adapted to perform one or more of the processes described herein. The policy administration component 46 can be implemented as one or more program code in the program control 44 stored in memory 22A as separate or combined modules. Additionally, the policy administration component 46 may be implemented as separate dedicated processors or a single or several processors to provide the functions described herein. While executing the computer program code, the processor 20 can read and/or write data to/from memory 22A, storage system 22B, and/or I/O interface 24. In this manner, the program code executes the processes of the invention.

The program code can include computer program instructions that are stored in a computer readable medium. The computer program instructions may also be loaded onto a computer, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable medium.

According to aspects of the invention, the policy administration component 46 may store policies associated with event identifiers and/or user information. For example, the policy administration component 46 may store policies that permit or prevent certain functions on the user device 210 based on the user's activity within a registered application, and the user's information (e.g., the user's login credential, user device hardware identifiers, etc.). In more specific embodiments, the policy administration component 46 may match an event identifier and/or user information to a set of policies, and may output the matched policies to the user device 210 to cause the user device 210 to set and implement the matched policies with a registered application, upon execution of an event with the registered policy. As an illustrative, non-limiting example, the policy administration component 46 may store a policy that prevents the user device 210 from capturing a screen shot when the user is accessing particular content within a registered application of the user device 210. As another illustrative, non-limiting example, the policy administration component 46 may store a policy to prevent the user device 210 to copy and paste text when the user of the user device 210 attempts to copy and/or paste text within a registered application. As another illustrative, non-limiting example, the policy administration component 46 may store a policy to prevent the user device 210 to capture an image when the user attempts to capture an image while using the registered application.

In embodiments, an administrator may register an application with the policy administration component 46 in order for the policy administration component 46 to output policies for the application. For example, the administrator may use a portal or other technique to register an application with the policy administration component 46, and store policies associated with various event identifiers and users of the registered application. In this way, the policy administration component 46 may match event identifiers and user information with policies, and output the matched policies to the policy setting component 48 for implementation on the user device 210.

As described herein, the user device 210 may include a policy setting component 48 which determines the occurrence of an event within a registered application, and communicates with the policy administration component 46 to receive device and application policies associated with an event identifier. The policy setting component 48 may obtain the policies, and implement the policies (e.g., by preventing or allowing the user device 210 from executing functions) as needed from the policy administration component 46. As described herein, the policy administration component 46 may return policies per a request from the policy setting component 48 each time an event occurs within a registered application. In this way, the policy setting component 48 may implement the most up-to-date policies without a redeployment, reinstallation, or restarting of the registered application. Also, the policy setting component 48 may store policies for offline use (e.g., to implement policies when the policy administration component 46 is inaccessible).

FIG. 2 shows an overview of an example environment in which aspects of the present invention may be implemented. As shown in FIG. 2, environment 200 may include the user device 210, a policy server 215, an application server 220, and networks 230. In embodiments, the policy server 215 can be representative of the server 12 of FIG. 1.

As described herein, the user device 210 may include a smartphone, tablet computer, personal digital assistant, or other computing device that includes a mobile operating system, wireless communication antenna, processor, user interface, memory, etc. The user device 210 may implement a registered application which may communicate with an application server 220 via the network 230 (e.g., to carry out the functions of the registered application). The user device 210 may include one or more components of the computing system 12 of FIG. 1.

The policy server 215 may include one or more computing/server devices that stores and matches policies associated with an event identifier and user information associated with the user device 210. The policy server 215 may include one or more components of the computing system 12 and may include the policy administration component 46 of FIG. 1.

The application server 220 may include one or more computing/server devices that support the implementation of network/cloud-based applications on the user device 210, including the implementation of a registered application. Additionally, or alternatively, the application server 220 may store applications for downloading to the user device 210. For example, the application server 220 may allow a user to upload an application for distribution to the user device 210. The application server 220 may include one or more components of the computing system 12 of FIG. 1.

The network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices 210 of the environment 200 may perform one or more functions described as being performed by another one or more of the devices of the environment 200. Devices of the environment 200 may interconnect via wired connections, wireless connections, or a combination of wired and wireless connections.

Referring still to FIG. 2, in operation, the policy setting component 48 of the user device 210 may detect the occurrence of an event within a registered application (step 1.1). For example, the policy setting component 48 may detect the occurrence of "Event 1" when a user has selected to perform a particular task within the registered application. As an illustrative example, the policy setting component 48 may detect that the user has attempted to take a screen shot or copy/paste text within the registered application. As another, non-limiting example, the policy setting component 48 may detect that the user has attempted to access a sub-application or particular content within the registered application.

Based on detecting the occurrence of the event, the policy setting component 48 may output an identifier of the event and/or user information to a policy server 215 via the network 230 (at step 1.2). The policy server 215 may include the components of the computing system 12 and may include the policy administration component 46 of FIG. 1. The policy server 215 will match policies associated with the event identifier and user information (at step 1.3), and provide the policies (at step 1.4) to the policy setting component 48 (e.g., via the network 230). The policy setting component 48 will receive and subsequently apply the policies (at step 1.5) on the event in order to implement the most up-to-date policies without the need to redeploy the registered application.

As an illustrative example, the policy setting component 48 may detect the occurrence of an event within a registered application, e.g., the user attempting to capture a screen shot or copy/paste texts. Alternatively, the policy setting component 48 may detect the occurrence of a different event, e.g., the user attempting to access a sub-application or particular content within the registered applications. Based on detecting the occurrence of the event, the policy setting component 48 may obtain the policies associated with the occurred event from the policy server 215. The policy server 215, knowing the user device information as received through the communication transmission, will match a set of policies for that user device 210 and event, and send the set of policies back to the policy setting component 48. The policy setting component 48 will receive the set of policies, and implement the policies against the event. As an example, the policy setting component 48 may receive a policy to prevent the capture of the screen shot, e.g., based on the occurred event of the user attempting to capture the screen shot and, hence, prevent such activity from occurring. Additionally, or alternatively, the policy setting component 48 may receive a policy to prevent the capture of the screen shot, e.g., based on the occurred event of the user accessing a sub-application within the registered application, and hence, prevent the event from occurring. Additionally, or alternatively, the policy setting component 48 may receive a policy to prevent the use of any device functions based on the occurrence of a different event within the registered application.

In embodiments, the policy setting component 48 may temporarily store the policies once received from the policy server 215. For example, the policy setting component 48 may store the policies for offline use in the event the policy server 215 is not accessible at a later time. In this way, certain events within a registered application may be subject to the stored policy even though the policy server 215 is not accessible. Alternatively, the policy setting component 48 may not have the ability to store the policies, and may only set and implement the policies based on the occurrence of an event within a registered application as returned from the policy server 215.

As described herein, the policy setting component 48 may execute the process of obtaining policies based on the occurrence of an event within a registered application. However, in embodiments, the occurrence of an event outside of the registered application will not trigger the retrieval or implementation of any policies. For example, as shown in FIG. 2, Event 3 is outside of the registered application. Thus, if Event 3 occurs, the policy setting component 48 would not obtain any device and/or application control policies. In this way, only user activity that occurs within a registered application is considered when obtaining and enforcing policies, thereby giving the user unrestricted access to device and application features when performing tasks in an unregistered application in which device and application control may not be needed. As an illustrative example, a registered application may be associated with a gateway to access sensitive company information in which device and application controls are needed to protect the sensitive information, whereas an unregistered application may include, for example, a gaming application in which device and application controls are not needed.

Figure 3:
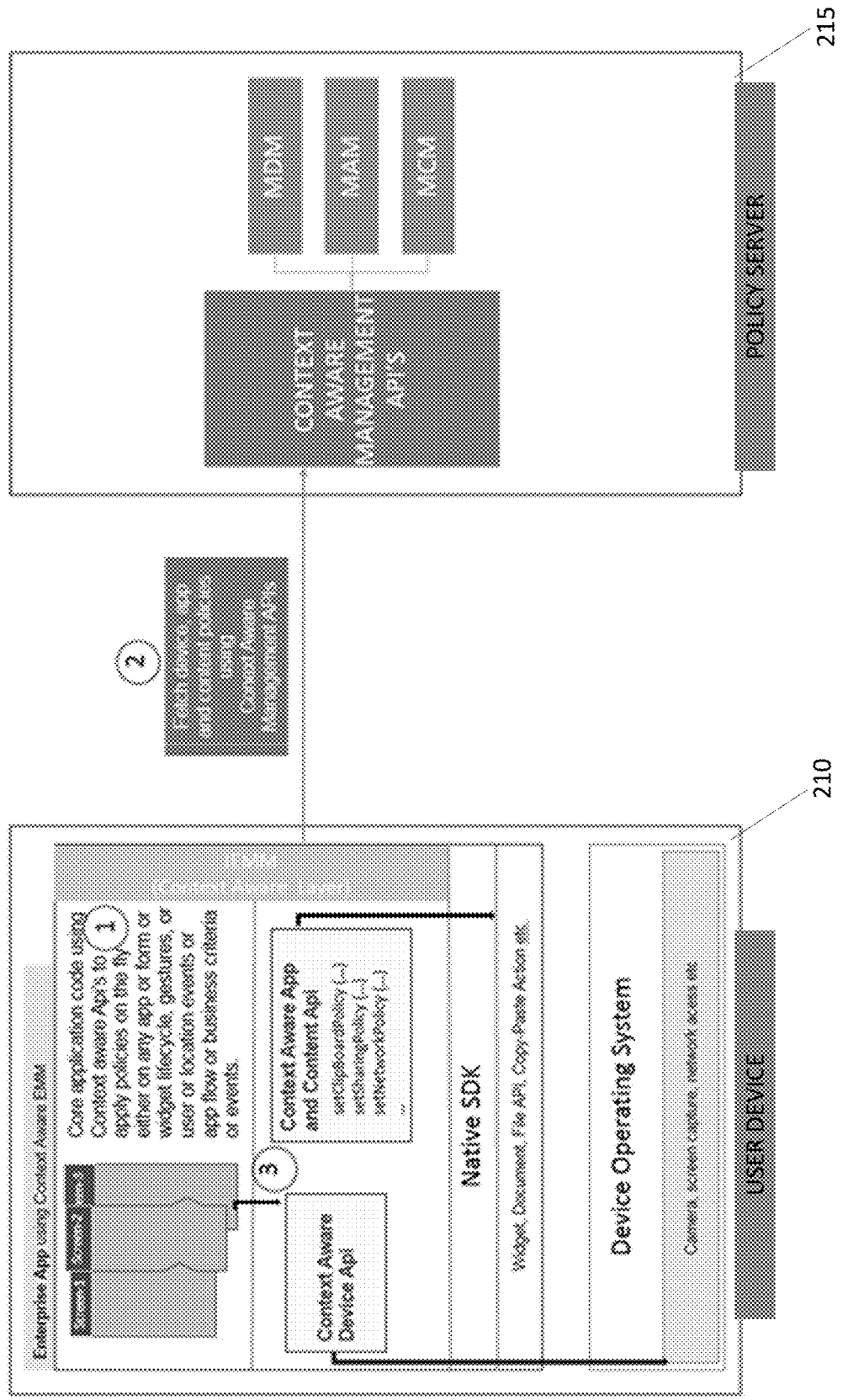
FIG. 3 shows an illustrative system for managing the processes in accordance with the present disclosure.

FIG. 3 shows an illustrative system for managing the processes in accordance with the invention. The contextual API framework leverages policies that are pushed from the policy server 215 (e.g., an enterprise mobile management server) to a registered application on the user device 210 via a contextually aware API. In this case, the processes and systems of the invention are not limited to handling access to an application, instead they can limit access to an application, content, or the device itself.

When invoked from the application level (at step 1), the application invokes the context aware device API to retrieve any policy that needs to be applied to the application from the policy server 215 (at step 2). The policy server 215 may use various components to identify the policy that is to be implemented. For example, the policy server 215 may use a context aware management API, a mobile device management (MDM) component, mobile application management (MAM) component, and/or mobile control management (MCM) component. If the policy server 215 is unavailable or the user device 210 does not have access, the application's previously store policies may be used. This could mean that the application has a policy that does not allow it to run without and a policy update from the policy server 215.

Once the policy is retrieved (at step 3), the context aware API sets any limitations to the user device 210 that is laid out in the policy. These policies can limit functions such as cut-and-paste, access to the file system, access to content or even access to the camera, screenshot capabilities, or other device level capabilities such as NFC, Bluetooth, or the user device 210 itself.

Figure 4:
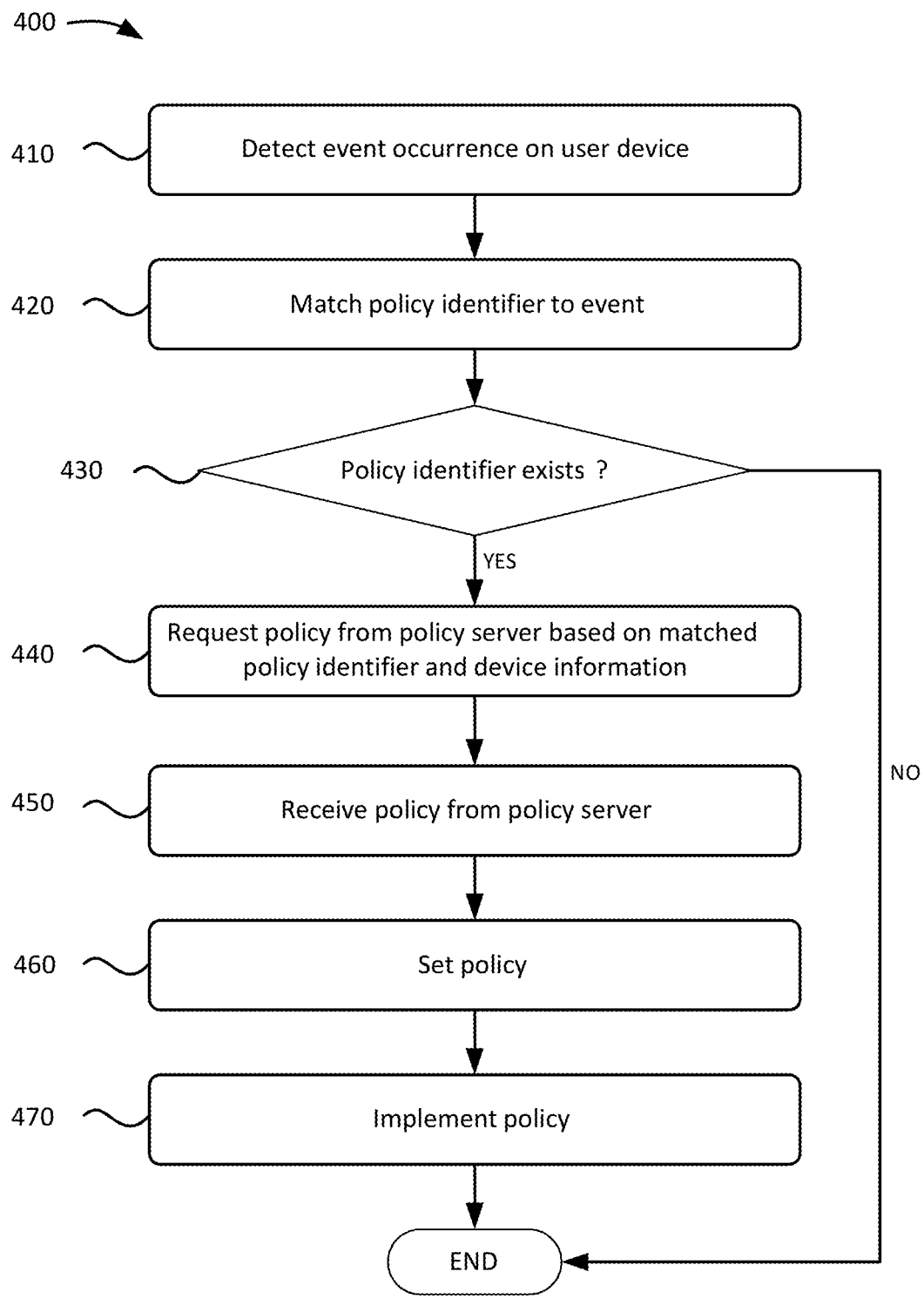
FIG. 4 shows an example flowchart for dynamically obtaining and implementing updated policies in accordance with aspects of the present disclosure.

FIG. 4 shows an example flowchart for dynamically obtaining and implementing updated policies, in accordance with aspects of the present invention. The steps of FIG. 4 may be implemented in the environment of FIGS. 1 and 2, for example, and are described using reference numbers of elements depicted in FIGS. 1 and 2. As noted above, the flowchart illustrates the architecture, functionality, and operation of possible implementations of systems, methods, and computer program products according to various embodiments of the present invention.

As shown in FIG. 4, at step 410, process 400 detects an event occurrence on the user device 210. For example, the policy setting component 48 may detect when an event has occurred on the user device (e.g., user selection of an application, content, or sub-application). The policy setting component 48 may also detect an event, such as the user's selection of copy/paste functions, screen shot capturing functions, image capturing functions, Bluetooth functions, WiFi functions, etc.

At step 420, a policy identifier may be matched to the event. For example, if the event occurs within a registered application, the registered application may be hardcoded with a policy identifier associated with the event.

If a policy identifier does not exist (e.g., if the event did not occur within a registered application, or if the registered application does not store a policy identifier for the event), at step 430, the process ends and no policies are implemented (e.g., if the event occurred in an application in which device and application control is not needed). If a policy identifier exists (e.g., if the event occurs within a registered application in which a hardcoded policy identifier is associated with the event), at step 440, a policy is requested from the policy server 215 based on the matched policy identifier and information regarding the user device 210. The policy server 215 may match the policy identifier and the information regarding the user device 210 to a policy. As described herein, the information regarding the user device 210 may include a mobile device ID, an integrated circuit card ID (ICCID), subscriber identity module (SIM), user credentials, and/or other information to identify the user of the user device 210. As described herein, different users may have access to different permissions. Accordingly, the policy server 215 may match the user information and the event identifier to a policy specific to the user.

At step 450, the policy is received from the policy server. At step 460, the policy is set on the user device. At step 470, the policy is implemented by processing permitted device and application functions and preventing blocked device and application functions from being processed or executed.

Figure 5:
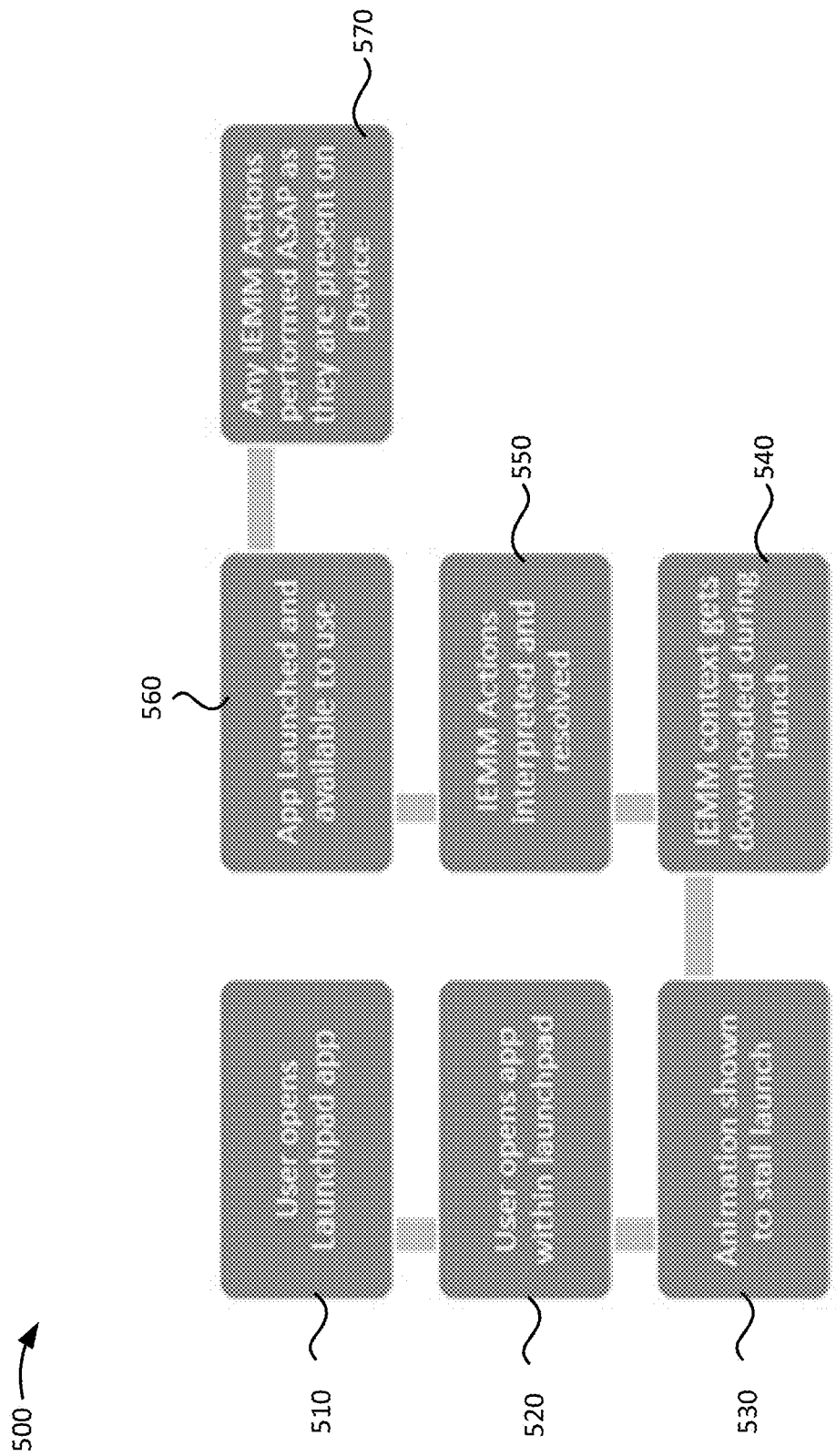
FIG. 5 shows an example flowchart for dynamically obtaining and implementing updated policies in accordance with aspects of the present disclosure.

FIG. 5 shows an example flowchart for dynamically obtaining and implementing updated policies, in accordance with aspects of the present invention. The steps of FIG. 5 may be implemented in the environment of FIGS. 1 and 2, for example, and are described using reference numbers of elements depicted in FIGS. 1 and 2. As noted above, the flowchart illustrates the architecture, functionality, and operation of possible implementations of systems, methods, and computer program products according to various embodiments of the present invention.

As shown in FIG. 5, at step 510, a user opens a "Launchpad app" (e.g., a registered application). At step 520, the user may open an application within the Launchpad app (e.g., a sub-application or content within the Launchpad app). At step 530, an animation may be displayed to stall the launch of the selected sub-application. As described herein, stalling the launch of the selected sub-application gives time for the policy setting component 48 to obtain policies from the policy server 215 and set the policies. At step 540, intelligent EMM (IEMM) context (e.g., control policies) is download during the launch of the selected sub-application. For example, the policy setting component 48 may download the IEMM context from the policy server 215. At step 550, IEMM actions are interpreted and resolved (e.g., by receiving and setting the policies included in the IEMM context).

At step 560, the sub-application is launched and ready for use with the policies implemented. For example, the policies may permit the execution of particular actions (e.g., IEMM actions). In embodiments, permitted actions may be displayed on the user device 210. At step 570, any IEMM actions are performed as presented on the user device 210.

Figure 6:
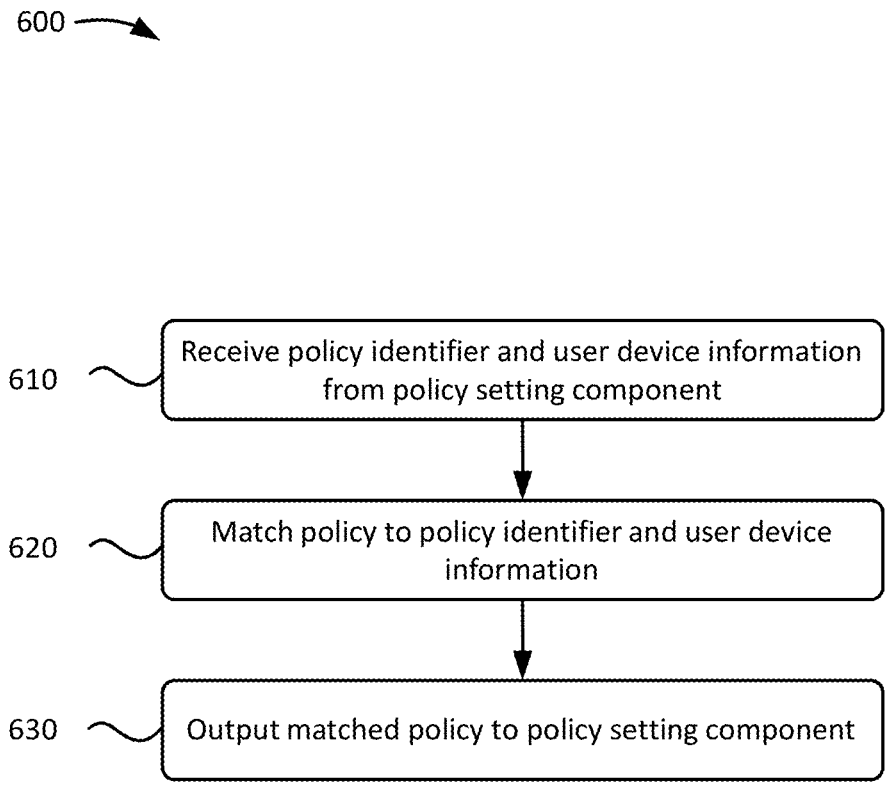
FIG. 6 shows an example flowchart for identifying and outputting up-to-date policies for implementation on a user device in accordance with aspects of the present disclosure.

FIG. 6 shows an example flowchart for identifying and outputting up-to-date policies for implementation on a user device in accordance with aspects of the present invention. The steps of FIG. 6 may be implemented in the environment of FIGS. 1 and 2, for example, and are described using reference numbers of elements depicted in FIGS. 1 and 2. As noted above, the flowchart illustrates the architecture, functionality, and operation of possible implementations of systems, methods, and computer program products according to various embodiments of the present invention.

As shown in FIG. 6, at step 610, process 600 receives a policy identifier and user device information from a policy setting component. For example, as described herein, the policy server 215 (e.g., the policy administration component 46 of the policy server 215) may receive the policy identifier and user device 210 information from the policy setting component 48 of a user device 210.

At step 620, a policy is matched to the policy identifier and the user device information. For example, a look-up table may be used to match the policy with the policy identifier and the user device information. At step 630, the matched policy is output to the policy setting component 48 of the user device 210. Based on receiving the matched policy, the policy setting component 48 may implement the policy.

FIG. 7 shows example data structures that may be used to identify policy information based on policy ID and user device information in accordance with aspects of the present invention. As shown in FIG. 7, an event to policy ID mapping field 710 may be stored by the user device 210 (e.g., in a storage medium of the user device 210). The event to policy ID mapping field 710 identifies events and corresponding policy IDs associated with the events. In embodiments, the policy ID mapping field 710 may be associated and/or hardcoded with a registered application. In the example shown in FIG. 7, events may include selection of an application, sub-application, and/or content. Additionally, or alternatively, the events may include invoking copy/paste functions, turning on/off WiFi functions, turning on/off Bluetooth functions, invoking a screen shot command, etc.

As further shown in FIG. 7, the policy mapping field 720 may be stored by the policy server 215 (e.g., in a storage medium of the policy server 215). The policy mapping field 720 may map policy IDs and user device information to a particular policy. As can be seen in FIG. 7, different policies may be associated with the same policy ID (e.g., the same event) for different users. In this way, different policies may be applied for different user devices 210. As described herein, policy updates need only be updated at the server level (e.g., within the policy server 215). For example, updates to the policy may be made by modifying the policy mapping field 720. Thus, policies can be updated without the need to redeploy the registered application.

As described herein, an application developer may use any suitable platform while developing a registered application. The application developer may use application programming interfaces (APIs) to query the set of policies available on the policy server 215. In embodiments, an application developer uses these APIs to query custom-attributes (global, user, & device level as set by an EMM admin), user's group participation information, and/or device information (e.g. Rooted or Jailbreak status). In embodiments, an application developer may write code to dynamically decide on a policy using the query services. The application developer may write code to request an EMM server (e.g., the policy server 215 to apply a policy in the user device 210. In embodiments, APIs may be used in the processes described herein. For example, APIs may be used by the user device 210 to request a policy from the policy server 215, receive the policy, and implement the policies. Additionally, or alternatively, APIs may be used by the policy server 215 to receive a policy identifier, lookup a policy associated with the policy identifier, and output the policy.

In embodiments, an application developer may provide the built registered application to an EMM administrator for publishing in an EMM enterprise store for distribution of the registered application. In embodiments, the registered application may be wrapped and signed in EMM. This wrapping may provide the actual server universal resource locator to APIs call which the application developer has used as described herein. In embodiments, the EMM enterprise store may be implemented by the computing system 12 of FIG. 1.

At runtime when a registered application is executed on a user device 210 based on context and query services, the registered application requests the policy server 215 to apply and revert policies dynamically. As an example, a registered application, without requiring its own authentication (to identify the user), can utilize the query services discussed above to decide and select a policy for the user device 210 for the duration when the registered application is running or is foreground on the user device 210. The actual policy is tightly controlled by an administrator on the policy server 215.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A method, comprising:
   receiving, by a server device, a policy identifier from a user device, wherein the policy identifier represents an occurrence of an event comprising a user instructing the user device to perform a task on an application installed in the user device;
   matching, by the server device, a policy to the policy identifier; and
   outputting, by the server device, the matched policy to the user device to cause the user device to set the policy on the user device with regard to whether to prevent or permit the user device to perform the task requested by the user, wherein policies are only obtained and implemented for registered applications so that only events that occur within the registered application are considered for applying the policy to permit preventing the user from performing the task requested by the user on the registered application, on the user device, which is remotely controlled by the server, without preventing the user from performing the task on an unregistered application, on the user device, which is not remotely controlled by the server, and wherein the receiving the policy identifier, the matching and the outputting occur during a delay of a presentation of a sub-application or content associated with the registered application, which delay is caused by stalling a launch of the sub-application in response to the user instructing the user device to perform the task, and which delay is for a time sufficient for the server device to provide the matched policy to the user device.

2. The method of claim 1, wherein the registered application is stored in a secure container.

3. The method of claim 1, wherein outputting the policy includes outputting a most current policy.

4. The method of claim 1, wherein the policy identifier is received when the user device matches the event to the policy identifier.

5. The method of claim 1, wherein outputting the matched policy further causes the user device to block the execution of functions identified by the policy.

6. The method of claim 1, further comprising receiving information regarding the user device,
wherein matching the policy is further based on the information regarding the user device.

7. The method of claim 1, wherein matching the policy comprises looking up the policy in a lookup table based on the policy identifier.

8. The method of claim 1, wherein the server device includes an Enterprise Mobility Management (EMM) server.

9. The method of claim 1, wherein the launch of the sub-application is stalled by displaying an animation for a time sufficient for the server device to provide the matched policy to the user device.

10. The method of claim 9, wherein the receiving of the policy identifier, the matching of the policy to the policy identifier and the outputting of the matched policy to the user device take place without restarting the application in order to perform the receiving, matching and outputting while the application is in use.

11. The method of claim 10, wherein the task instructed by the user is at least one selected from a group consisting of:
screen capturing functions;
image capturing functions;
WiFi functions;
Bluetooth functions;
NFC functions;
copy/paste functions;
telephone calling functions; and
messaging functions.

12. A computer program product comprising a computer readable medium having program instructions embodied therewith, wherein the computer readable medium is not a transitory signal per se, and the program instructions are readable by a server device to cause the server device to perform a method comprising:
receiving a policy identifier from a user device when the user device detects the occurrence of an event on a registered application which is remotely controlled by the server device, wherein the policy identifier represents the occurrence of an event comprising a user instructing the user device to perform a task on the registered application;
matching a policy to the policy identifier; and
outputting the matched policy to the user device to cause the user device to set the policy on the user device with regard to whether to prevent or permit the user device to perform the task requested by the user device on the registered application,
wherein policies are only obtained and implemented for registered applications so that only events that occur within the registered application are considered for receiving the policy identifier and outputting the matched policy to the user device to permit preventing the user from performing the task requested by the user on the registered application, on the user device, which is remotely controlled by the server, while providing unrestricted access to the user for performing the task on an unregistered application, on the user device, which is not remotely controlled by the server, and
wherein receiving the policy identifier occurs during a time when a launch of a sub-application of the registered application in response to the user requesting performing the task on the user device is stalled by displaying an animation for a time sufficient for the server device to provide the matched policy to the user device.

13. The method claim 12, wherein outputting the policy includes outputting a most current policy.

14. The method claim 12, wherein outputting the matched policy further causes the user device to block the execution of functions identified by the policy.

15. The method of claim 14, wherein the matched policy disables, on the user device, at least one of:
screen capturing functions;
image capturing functions;
WiFi functions;
Bluetooth functions;
NFC functions;
copy/paste functions;
telephone calling functions;
messaging functions;
access to forms; and
access to applications.

16. The method of claim 12, further comprising receiving information regarding the user device,
wherein matching the policy is further based on the information regarding the user device.

17. The method of claim 12, wherein the server device includes an Enterprise Mobility Management (EMM) server.

18. The method of claim 12, wherein matching the policy comprises looking up the policy in a lookup table based on the policy identifier.

19. A system comprising:
a CPU, a computer readable memory and a computer readable medium;
program instructions to receive a policy identifier from a user device based on an occurrence of an event in a registered application, among one or more registered applications, on the user device which is remotely controlled by the CPU, which event is an instruction by a user to the user device to perform a task on the registered application;
program instructions to match a policy to the policy identifier; and program instructions to output the matched policy to the user device to cause the user device to apply the policy to determine whether to prevent the user from performing the task on the registered application requested by the user, wherein policies are only obtained and implemented for registered applications so that only events that occur within the one or more registered applications are considered for applying the policy to permit preventing the user from performing the task requested by the user on the one or more registered applications, on the user device, which is remotely controlled by the CPU, without preventing the user from performing the task on an unregistered application, on the user device, which is not remotely controlled by the CPU, wherein the program instructions are stored on the computer readable medium for execution by the CPU via the computer readable memory, and wherein receiving the policy identifier occurs during a delay of a presentation of a sub-application or content associated with the registered application on the user device by stalling a launch of the sub-application in response to the user instructing the user device to perform the task, which delay is for a time sufficient for the CPU to provide the matched policy to the user device.

20. The system of claim 19, wherein matching the policy includes using a lookup table to match the policy to the policy identifier.

* * * * *